United States Patent [19]

Iinuma

[11] 4,142,205
[45] Feb. 27, 1979

[54] INTERFRAME CODEC FOR COMPOSITE COLOR TV SIGNALS COMPRISING MEANS FOR INVERTING THE POLARITY OF CARRIER CHROMINANCE SIGNALS IN EVERY OTHER FRAME OR LINE

[75] Inventor: Kazumoto Iinuma, Tokyo, Japan

[73] Assignee: Nippon Electric Co., Ltd., Tokyo, Japan

[21] Appl. No.: 816,992

[22] Filed: Jul. 19, 1977

[30] Foreign Application Priority Data

Jul. 21, 1976 [JP] Japan .................................. 51-87037
Nov. 25, 1976 [JP] Japan .................................. 51-141949

[51] Int. Cl.² ............................................. H04N 9/32
[52] U.S. Cl. ................................................... 358/13
[58] Field of Search ....................... 358/12, 13, 14, 15, 358/16

[56] References Cited

U.S. PATENT DOCUMENTS 3,946,432  3/1976  Goldberg et al. ...................... 358/13

*Primary Examiner*—Richard Murray
*Attorney, Agent, or Firm*—Sughrue, Rothwell, Mion, Zinn and Macpeak

[57] ABSTRACT

An interframe encoder for a composite color television signal comprises an inverter for inverting the polarity of the carrier chrominance signal. Responsive to a switching signal synchronized with the frame or line periods, the television signal and the polarity-inverted signal are alternatingly switched into a converted signal in which the polarity of the carrier chrominance signal is inverted in every other frame or line period. The converted signal is interframe encoded. An interframe decoder reproduces the converted signal and the switching signal and comprises an inverter for inverting the polarity of the reproduced carrier chrominance signal. Responsive to the reproduced switching signal, the reproduced and polarity-inverted carrier chrominance signal and the converted signal are switched into a reproduction of the color television signal.

18 Claims, 10 Drawing Figures

INTERFRAME CODEC FOR COMPOSITE COLOR TV SIGNALS COMPRISING MEANS FOR INVERTING THE POLARITY OF CARRIER CHROMINANCE SIGNALS IN EVERY OTHER FRAME OR LINE

BACKGROUND OF THE INVENTION

This invention relates to a system for encoding composite color television signals into interframe encoded signals for transmission thereof and/or decoding the interframe encoded signals for reception of the color television signals.

For digital transmission of television signals in general, an interframe code transmission system is already known as an effective band-compression transmission system for reducing as far as possible the number of bits to be transmitted and for thereby raising the efficiency of transmission channels. The interframe encoding makes use of interframe correlation of the television signals and is capable of effectively compressing the frequency band of television signals for slowly changing objects.

The present-day color television signals, such as those according to NTSC, PAL, and SECAM systems, are composite color television signals wherein frequency multiplication is carried out for a luminance signal, such as a Y signal, and a carrier chrominance signal. The latter signal results from modulation of a subcarrier by chrominance signals, such as an I and a Q signal. When applied to a composite color television signal, a sophisticated interframe code transmission system is objectionable because prediction errors between frames for the chrominance signals grow large to render it impossible to carry out the effective band compression. More particularly, let the NTSC system be taken into consideration. The subcarrier frequency $f_{SC}$ is 455/2 times the horizontal scanning frequency $f_H$, which is, in turn, 525 times the frame frequency $f_F$. Namely, the subcarrier frequency $f_{SC}$ is an odd integral multiple of a half ($\frac{1}{2}$) of the frame frequency $f_F$. The subcarrier therefore has a phase difference of 180° between two adjacent frames. This inevitably amplifies by a factor of about two the interframe or frame-to-frame difference signals for the chrominance signals. As a result, the effective band compression is not achieved. In order to solve the problem arising from the phase difference of the subcarrier, the interframe encoding has been carried out by resorting to the so-called separate coding where the carrier chrominance signal is preliminarily demodulated on the transmitter side into separate baseband signals, such as the I and Q signals, and wherein the luminance and chrominance signals are subsequently separately subjected to interframe encoding. On the reception side, the original NTSC signal is reproduced from the luminance signal and the interframe decoded chrominance signals. For detail, reference may be had, if desired, to an article contributed by Kazumoto Iinuma et al. to IEEE Transactions on Communications, Vol. COM-23, No. 12 (December 1975), pp. 1461-1466, and entitled "Interframe Coding for 4-MHz Color Television Signals."

The separate coding, however, is defective in that the system therefor is complicated. For example, the transmitter has to comprise a decoder for the NTSC signal and an analog-to-digital converter for each of the luminance and chrominance signals. The receiver has to comprise a digital-to-analog converter again for each of the luminance and chrominance signals and an encoder for the NTSC signal. Furthermore, the separate coding is defective in that the wave form of the signals are inevitably distorted during the demodulation for transmission and the re-modulation for the reception otherwise to degrade the quality of the pictures.

SUMMARY OF THE INVENTION

It is therefore an object of the present invention to provide a system for carrying out direct conversion between composite color television signals and interframe encoded signals wherein use is not made of separate coding and yet whereby it is possible to suppress the unwanted increase in the quantity of information to be transmitted which otherwise results from the carrier chrominance signals.

It is another object of this invention to provide a system of the type described, which is simple in structure and yet introduces no flickers into reproduced pictures.

According to this invention, there is provided a system for carrying out conversion between a composite color television signal and an interframe encoded signal. The television signal carries a luminance signal and a carrier chrominance signal. The carrier chrominance signal is given by a subcarrier modulated by baseband chrominance signals. The system comprises an encoder that, in turn, comprises converted signal producing means responsive to the television signal for producing a converted signal in which the polarity of the carrier chrominance signal is inverted in every other frame or line period of the television signal and interframe encoding means for interframe encoding the converted signal into the interframe encoded signal.

For a system set forth in the next preceding paragraph, a decoder comprises interframe decoding means for decoding the interframe encoded signal into a reproduction of the converted signal and recovering means responsive to the reproduction of the converted signal for inverting the polarity of the carrier chrominance signal in every other frame or line period of the television signal to produce a reproduction of the television signal.

DESCRIPTION OF THE PREFERRED EMBODIMENT

Figure 1:
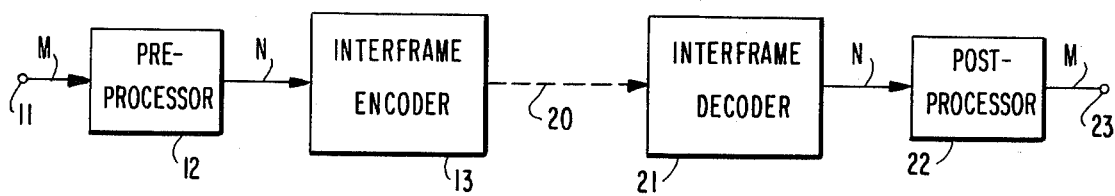
FIG. 1 is a block diagram of an interframe encoding transmission system according to a preferred embodiment of this invention.

Referring to FIG. 1, a system according to a preferred embodiment of the present invention is for encoding a composite color television signal M into an interframe encoded signal for transmission thereof and for decoding the interframe encoded signal for reception of the television signal. On the transmitter end of the system, the television signal M supplied to a system input terminal 11 is converted by a pre-processor 12 into a converted signal N, as called herein, in which the polarity of the carrier chrominance signal is inverted either in every other frame or in every other line. An interframe encoder 13 encodes the converted signal N into the interframe encoded signal and places the latter signal on a transmission channel 20. On the receiver end, an interframe decoder 21 decodes the interframe encoded signal to reproduce the converted signal N, which a post-processor 22 processes into a reproduction of the original composite color television signal M and supplies the reproduction to a system output terminal 23. A system according to this invention is characterized by provision of the pre-processor 12 and/or the post-processor 22. Inasmuch as the post-processor 22 carries out a reversed operation of the pre-processor 12, they will be described hereinafter in a side-by-side fashion. As will later be described, the interframe encoder 13 and decoder 21 are only slightly different from conventional ones in that they comprise facilities for receiving and reproducing, respectively, a code that serves as a criterion for discriminating between the polarity-inverted frames or lines and the polarity-untouched frames or lines.

Figure 2:
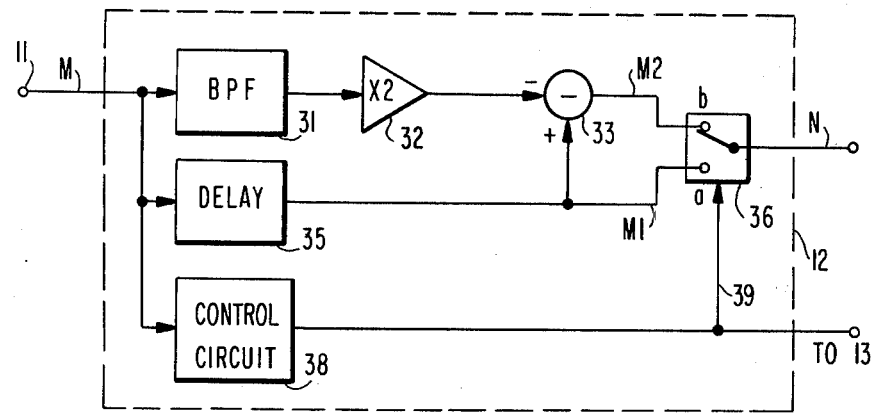
FIG. 2 is a block diagram of a first example of a pre-processor used in the system illustrated in FIG. 1.
Figure 3:
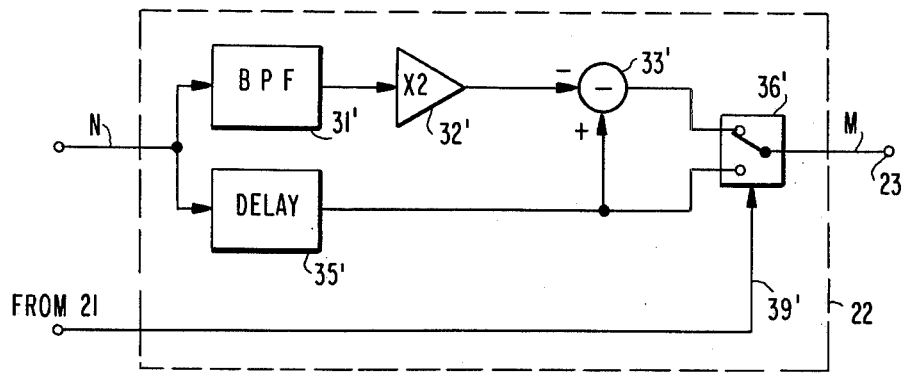
FIG. 3 is a block diagram of a first example of a post-processor used in the system according to the preferred embodiment.

Referring to FIGS. 2 and 3, a first example of the pre-processor 12 comprises a band-pass filter 31 for frequency-separating the carrier chrominance signal from the television signal M. A multiplier 32 multiplies the separated carrier chrominance signal by a predetermined factor, such as two, and supplies a multiplied carrier chrominance signal to a subtractor 33. The television signal M is supplied also to a delay or compensation circuit 35 for supplying a compensated composite color television signal $M_1$ to the subtractor 33 and to a first input terminal a of a switch circuit 36. The delay circuit 35 is for compensating the delay caused by the band-pass filter 31 to the separated carrier chrominance signal. The subtractor 33 subtracts the multiplied carrier chrominance signal from the compensated television signal $M_1$ to supply a polarity-inverted signal $M_2$ to a second input terminal b of the switch circuit 36. The original television signal M is supplied furthermore to a control signal producing circuit 38 for producing a switching signal 39, described later in detail. Controlled by the switching signal 39, the switch circuit 36 switches between the compensated television signal $M_1$ and the polarity-inverted signal $M_2$ to produce the converted signal N. The switching signal 39 is supplied also to the interframe encoder 13 and thence to the receiver. An example of the post-processor 22 comprises similar parts designated by like reference numerals with primes added thereto execpt that the input and output signals are the reproductions of the converted signal N and the original color television signal M and that the switching signal 39' is supplied from the interframe decoder 21 rather than produced therein.

Figure 4A:
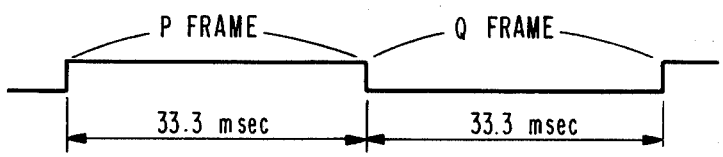
FIG. 4 schematically shows two examples of the wave form of a switching signal produced in the pre-processor or used in the post-processor depicted in FIG. 1.
Figure 4B:
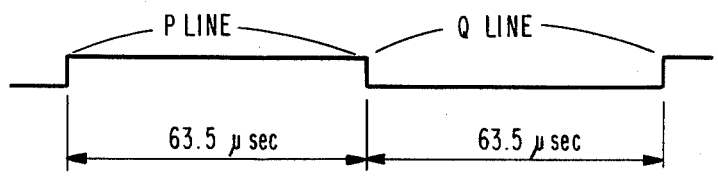

Referring to FIG. 4a, which illustrates switching signal 39 or 39', the latter signal is at a high level during a P-th frame period and a low level during a next following Q-th frame period. The signal 39 or 39' controls the switch circuit 36 so that the polarity of the separated carrier chrominance signal is inverted during every other frame period. The frame period in which the polarity is inverted in the converted signal N will be referred to herein by the designation, P frames. Those frames in which the polarity is untouched will be referred to as Q frames. FIG. 4b shows the switching signal 39 or 39' which assumes a high and a low level during P-th line period and a next following Q-th line period, respectively. The line periods during which the polarity of the carrier chrominance signal is inverted and remains untouched in the converted signal N will be referred to as P lines and Q lines, respectively. For television signals of the NTSC system, the frame and the line periods are 33.3 milliseconds and 63.5 microseconds, respectively, as labelled.

It is possible to give the composite color television signal M(t) of a certain frame period t by:

$$M(t) = Y(t) + C_1(t)\cdot\phi_1(t) + C_2(t)\cdot\phi_2(t),$$

where Y(t) represents the luminance signal, $C_1(t)$ and $C_2(t)$ represent the chrominance signals, and $\phi_1(t)$ and $\phi_2(t)$ are given by:

$$\phi_1(t) = \sin 2\pi f_{SC} t$$

and $$\phi_2(t) = \cos 2\pi f_{SC} t,$$

respectively. Inasmuch as:

$$\phi_1(t - T_F) = -\phi_1(t)$$

and $$\phi_2(t - T_F) = -\phi_2(t)$$

in a next following frame period $t - T_F$, where $T_F$ represents a frame period, namely, $1/f_F$, $$M(t - T_F) = Y(t - T_F) - C_1(t - T_F)\cdot\phi_1(t) - C_2(t - T_F)\cdot\phi_2(t)$$

gives the television signal M in the next following frame period. Unless the object being televised discontinuously varies during scan of the two adjacent frame periods, the signals $(t - T_F)$, $C_1(t - T_F)$, and $C_2(t - T_F)$ are nearly equal to the signals Y(t), $C_1(t)$, and $C_2(t)$, respectively. Therefore:

$$M(t - T_F) \doteq Y(t) - C_1(t)\cdot\phi_1(t) - C_2(t)\cdot\phi_2(t)$$

results, which shows that the phase of the carrier chrominance signal differs by 180° in every other frame. The band-pass filter 31 gives a substantial attenuation to most of the luminance signal Y(t). Therefore, inversion of the polarity occurs as shown by:

$$M_2(t) \doteq Y(t) - C_1(t)\cdot\phi_1(t) - C_2(t)\cdot\phi_2(t) \qquad (1)$$

in the above-mentioned polarity inverted signal $M_2$.

It is presumed at first that the switch circuit 36 switches the signals $M_1$ and $M_2$ by frames and that a current frame period t is a Q frame and the next following frame period $t - T_F$ is a P frame. The converted signal N is given by:

$$N(t) = M_1(t) = Y(t) + C_1(t)\cdot\phi_1(t) + C_2(t)\cdot\phi_2(t)$$

and $$N(t - T_F) = M_2(t - T_F) \doteq Y(t - T_F) + C_1(t - T_F)\cdot\phi_1(t) + C_2(t - T_F)\cdot\phi_2(t),$$

which show that the phase of the carrier chrominance signal little varies throughout the frames. When the object remains substantially at a standstill, the converted signal $N(t)$ of a certain frame is nearly equal to the inverted signal $N(t - T_F)$ of the next following frame. This renders the interframe difference signal substantially zero and makes it possible to carry out the interframe encoding at a high efficiency. Even when the switching is carried out by line, the interframe difference signal is rendered substantially zero because a horizontal line of a certain frame is traced by a 525-th horizontal line in a next following frame. It is now obvious for the post-processor 22 that the original television signal M is reproduced by inverting the polarity of the carrier chrominance signal for the P frames for the P lines.

Although analog techniques are applicable, it is preferred for insurance of precision of the calculation that the pre-processor 12 and the post-processor 22 comprise digital circuit elements. Examples will be described hereunder.

It is to be noted here that the pre-processor 12 illustrated with reference to FIG. 2 is excellent due to its simplicity of structure but is somewhat objectionable because the interframe difference signal, represented hereafter by $D(t)$, becomes large for a higher frequency component $Y_H$ of the luminance signal Y. More particularly, the higher frequency component $Y_H$ appears along with the carrier chrominance signal in the output signal of the band-pass filter 31 because the composite color television signal M has a higher frequency region that is common to both luminance and carrier chrominance signals. As a result, Equation (1) is:

$$M_2(t) \doteq Y(t) - 2Y_H(t) - C_1(t)\cdot\phi_1(t) - C_2(t)\cdot\phi_2(t)$$

when given more strictly. For a standstill object, $$D(t) = M_1(t) - M_2(t - T_F) \doteq 2Y_H(t)$$

results, which shows that the higher frequency luminance signal component $Y_H$ is multiplied by a factor of about two in the interframe difference signal $D(t)$.

Figure 5:
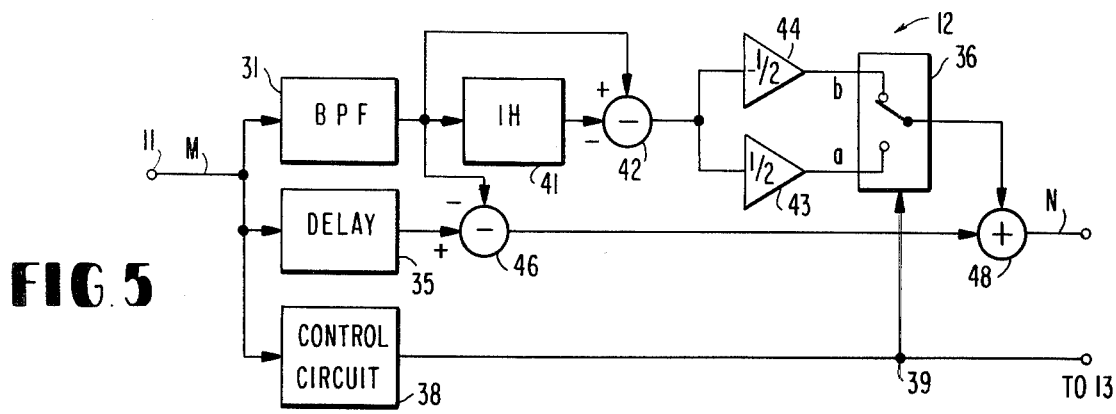
FIG. 5 is a block diagram of a second example of a pre-processor for use in the system shown in FIG. 1.

Referring now to FIG. 5, another example of the pre-processor 12 comprises similar parts designated by like reference numerals as in FIG. 2. The pre-processor 12 further comprises a one-line delay circuit 41 for giving a delay of one line period H, namely, $1/f_H$, to the output signal of the band-pass filter 31. A first subtractor 42 subtracts the one-line delayed signal from the undelayed signal to supply a first difference signal to first and second multipliers 43 and 44 for multiplying the difference signal by factors of $\frac{1}{2}$ and $-\frac{1}{2}$, respectively, to supply the multiplied signals to the first and second input terminals a and b of the switch circuit 36. A second subtractor 46 subtracts the undelayed signal from the delay compensated signal to supply a second difference signal to an adder 48 to which the switched signal is also supplied.

As discussed hereinabove, description of operation for switching by frame is sufficient. Let it therefore be assumed that the switching signal 39 controls the switch circuit 36 to make the same produce the signal supplied to the first input terminal a during the Q frames and the signal supplied to the second input terminal b during the P frames. The converted signal N is given for the Q frames by:

$$N(t) = Y_L(t) + [Y_H(t) - Y_H(t - T_H)]/2 + [C_1(t) + C_1(t - T_H)]\cdot\phi_1(t)/2 + [C_2(t) + C_2(t - T_H)]\cdot\phi_2(t)/2$$

and for the P frames by:

$$N(t) = Y_L(t) - [Y_H(t) - Y_H(t - T_H)]/2 - [C_1(t) + C_1(t - T_H)]\cdot\phi_1(t)/2 - [C_2(t) + C_2(t - T_H)]\cdot\phi_2(t)/2,$$

where $Y_L(t) = Y(t) - Y_H(t)$ and $T_H$ represents a horizontal scanning period or a line period, namely, $1/f_H$. During conversion, the polarity of the chrominance signals is inverted in every other frame while the chrominance signals are averaged for two adjacent ones of the lines. Inasmuch as:

$$Y_H(t) \doteq Y_H(t - T_H)$$

for pictures having strong vertical correlation, the conversion is equivalent to attenuation of the higher frequency luminance signal component by a comb filter. The interframe difference signal $D(t)$ for a standstill object becomes:

$$\text{ti } D(t) = Y_H(t) - Y_H(t - T_H) \quad (2)$$

in the converted signal N and is equal to a difference of the higher frequency luminance signal component $Y_H$ between lines. Inasmuch as the line difference is usually small in a picture, it is feasible to carry out the interframe encoding at a high efficiency. It is possible to use the post-processor 22 shown in FIG. 3 in combination with the pre-processor 12 illustrated with reference to FIG. 5.

Before describing the present invention further, a brief description will be made of a sub-Nyquist interframe code transmission system for a composite color television signal. According to the sub-Nyquist encoding, sub-sampling is carried out by the use of a sub-Nyquist sampling signal of a sub-Nyquist sampling frequency that is lower than the Nyquist frequency (twice the signal bandwidth). In the transmitter, samples are derived from the signal at instants when the subcarrier has a phase difference of about 180° with the phase of the sampling signal shifted by 180° in every other line. In the receiver, each sample or picture element between two sampling instants is derived by interpolation from adjacent samples. Inasmuch as the polarity of the carrier chrominance signal differs by 180° in every other frame also according to the sub-Nyquist encoding, mere application thereof to the interframe encoding results in amplification of the carrier chrominance signal by a factor of about two to adversely affect the band-compression efficiency. As regards the sub-Nyquist encoding, reference may be had, if desired, to the specification of a copending United States patent application Ser. No. 661,689 filed July 21, 1976, by Yukihiko Iijima and Tatsuo Ishiguro, the present joint applicants and assignors to the present assignee.

Figure 6:
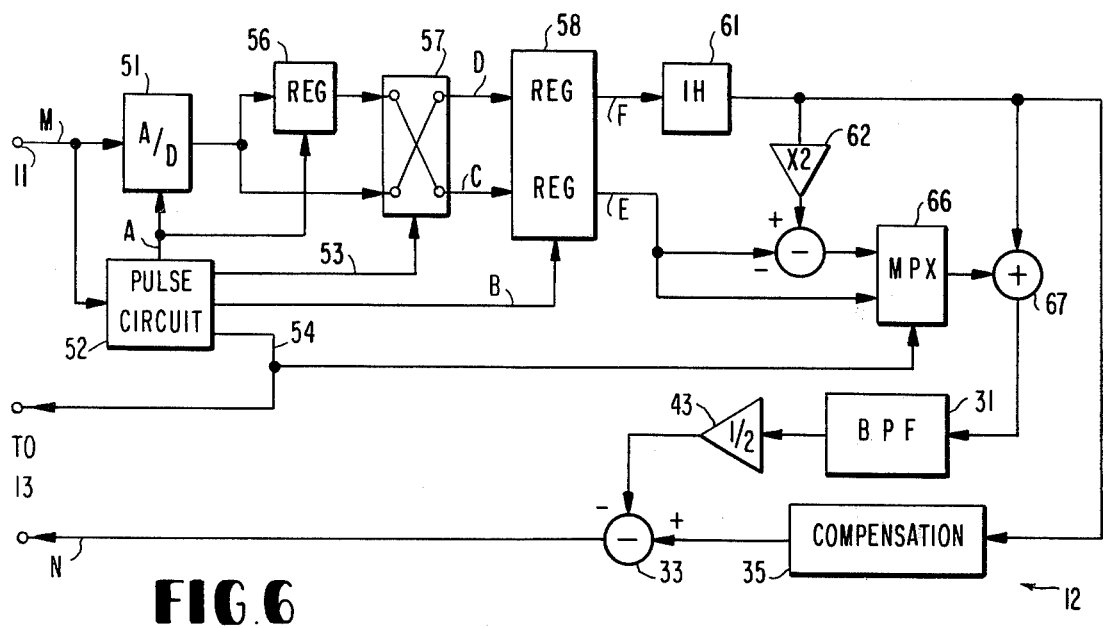
FIG. 6 is a block diagram of a third example of a pre-processor for use in the system depicted in FIG. 1.
Figure 7:
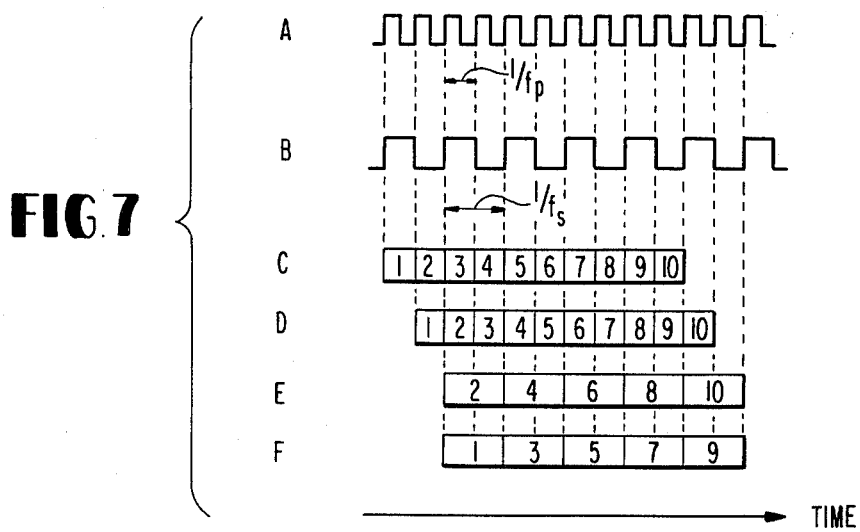
FIG. 7 is a schematic time chart of signals used in the pre-processor illustrated in FIG. 6.

Turning to FIGS. 6 and 7, still another pre-processor 12 is for the sub-Nyquist interframe encoding of a composite color television signal M and comprises an analog-to-digital converter 51 and a pulse producing circuit 52 for separating the synchronizing signals from the television signal M to produce a sequence A of sampling pulses of a sampling frequency $f_P$ for use in sampling the television signal M at the analog-to-digital converter 51, another sequence B of sub-Nyquist sampling pulses of a sub-Nyquist sampling frequency $f_S$, a line switching signal 53, and a frame (or line) switching signal 54. The sampling frequency $f_P$ for the analog-to-digital conversion is set at about four times the subcarrier frequency $f_{SC}$. When the former frequency is four times the latter frequency, the phase of the subcarrier differs by 90° at the successive sampling instants. The sub-Nyquist sampling frequency $f_S$ is set at a half ($\frac{1}{2}$) of the sequence A sampling frequency $f_P$. The analog-to-digital converter 51 produces a first sample sequence C, to which a register 56 gives a delay of one sample to produce a second sample sequence D in response to the sequence-A sampling pulses used as the clock pulses. Responsive to the line switching signal 53, a switch circuit 57 alternatingly produces the first and second sample sequences C-D in every other line period. The switched sample sequences C-D are sub-sampled by a register set 58 into third and fourth sample sequences E and F, respectively, in response to the sub-Nyquist sampling pulses B. For convenience of reference, samples in the sequences C-F are numbered from 1 to 10. For the samples of the third or fourth sequence E or F, the phase of the subcarrier differs by 180°. For the sequences E-F, the subcarrier phase differs by 90°. Samples of the third and fourth sequences E-F are sub-Nyquist encoded samples.

Referring again to FIGS. 6 and 7, the pre-processor 12 further comprises a one-line delay circuit 61 for giving a delay of one line period H to the fourth sample sequence F to produce a delayed sub-Nyquist sample sequence, which a multiplier 62 multiplies by a factor of about two to produce a multiplied sample sequence. When the television signal M is of the NTSC system and when the sequence-A and the sub-Nyquist sampling frequencies $f_P$ and $f_S$ are equal to four times and twice the subcarrier frequency $f_{SC}$, it is possible to provide the delay circuit 61 either by a shift register or a memory for giving a delay of 455 samples. A subtractor 63 subtracts the third sample sequence E from the multiplied sample sequence to produce a difference sample sequence. Responsive to the frame switching signal 54, a multiplexer 66 multiplexes the third sample sequence E and the difference sample sequence into a multiplexed sample sequence, in which the polarity of the carrier chrominance signal is inverted in every other frame. The multiplexer 66 thus corresponds to the switch circuit 36 described in conjunction with FIGS. 2-3 and 5. An adder 67 adds the multiplexed sample sequence and the delayed sample sequence to produce an averaged carrier chrominance signal which, in effect, is a mean value of the carrier chrominance signal and a one-line delayed carrier chrominance signal. The remaining portion of the pre-processor 12 is equivalent to the pre-processor illustrated with reference to FIGS. 2-3 and 5 except that the averaged carrier chrominance signal, after caused to pass through the band-pass filter 31, is substituted for the above-described carrier chrominance signal. This improves the overall performance of the transmitter and receiver. It will now be seen that this pre-processor 12 is similar to a circuit comprising comb filters for use in the sub-Nyquist encoding except for the subtractor 63 and multiplier 66 for use in inverting the polarity and that the sub-Nyquist encoding is readily applicable to a system according to the present invention.

In order to simplify description of operation, use is made in the following of Z transforms where $Z^{-n}$ represents a delay by n samples and accordingly $Z^{-H}$, a one-line delay. By the use of the Z transform M(Z) of the television signal M, the Z transform N(Z) of the converted signal N is given for the Q frames by:

$$N(Z) = [A(Z) + (1 - Z^H) \cdot B(Z)/2] \cdot Z^{-H} \cdot M(Z)$$

and for the P frames by:

$$N(Z) = [A(Z) - (1 - Z^H) \cdot B(Z)/2] \cdot Z^{-H} \cdot M(Z),$$

where $A(Z) = 1 - B(Z)$ and B(Z) represents the Z transform of the transfer function of the band-pass filter 31. The Z transform D(Z) of the interframe difference signal D(t) is:

$$D(Z) = [(1 - Z^{-F}) \cdot A(Z) + (1 + Z^{-F}) \cdot (1 - Z^H) \cdot B(Z)/2] \cdot M(Z), \qquad (3)$$

where $Z^{-F}$ represents a one-frame delay. In the expansion of Equation (3), the first term represents an interframe difference of a lower frequency component, while the second term, a sum for each frame of an interline difference of a higher frequency component including the carrier chrominance signal. For a standstill object, the first term becomes zero. The second term for the carrier chrominance signal also becomes zero. What remains is therefore the interline difference of the higher frequency luminance signal component $Y_H$ as in Equation (2). According to the digital techniques, the band-pass filter 31 is provided by registers and adders because it is possible to give the Z transform B(Z) by:

$$B(Z) = (1 - Z^{-1})^2 \cdot (1 + Z^{-2})/8$$

or $$B(Z) = (1 - Z^{-1})^2 \cdot (1 - Z^{-2}) \cdot (1 + Z^{-4})/16.$$

Figure 8:
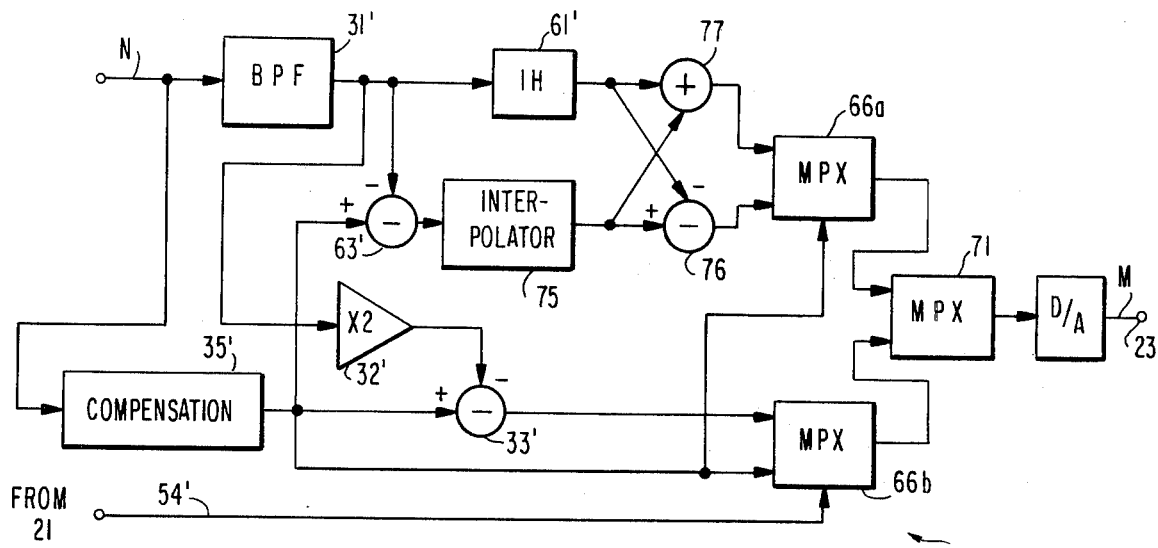
FIG. 8 is a block diagram of a post-processor for use in the system according to the preferred embodiment in combination with the pre-processor shown in FIG. 6.

Referring to FIG. 8, a post-processor 22 is for use in cooperation with the pre-processor 12 illustrated with reference to FIGS. 6 and 7 and produces the original composite color television signal M by carrying out interpolation for the picture elements deleted on the transmitter side. The post-processor 22 comprises a band-pass filter 31', a multiplier 32', a first subtractor 33', and a compensation circuit 35' described with reference to FIGS. 1–4 for processing the reproduction of the converted signal N by the use of the frame (or line) switching signal 54' produced in the interframe decoder 21. The post-processor 22 further comprises a one-line delay circuit 61', a second subtractor 63', a first multiplexer 66a, and a second multiplexer 66b that are equivalents of the circuit elements described in conjunction with FIG. 6. As described, the compensation circuit 35' gives the delay for compensation to the reproduction of the converted signal N. The compensated signal for the Q frames is caused to pass through the second multiplexer 66b under the control of the switching signal 54' and is supplied to a third multiplexer 71 to be multiplied thereby with interpolated picture element signals, described later. The third multiplexer 71 converts the signal dealt with at the sub-Nyquist sampling frequency $f_S$ into those taken at twice the sub-Nyquist sampling frequency $2f_S$, namely, $f_P$. On the other hand, the first subtractor 33' inverts the polarity of the carrier chrominance signal in the compensated signal to produce a polarity inverted signal. Under the control of the frame switching signal 54', the second multiplexer 66b allows the inverted signal to pass therethrough towards the third multiplexer 71.

Further referring to FIG. 8, the interpolated picture element signals are produced by the use of interpolated samples for the lower frequency luminance signal and those for the carrier chrominance signal. For this purpose, the second subtractor 63' subtracts the carrier chrominance signal from the compensated signal to deliver the lower frequency luminance signal to an interpolator 71, for which it is sufficient to use a circuit for deriving the mean value of each adjacent sample pair. The interpolated samples for the carrier chrominance signal of each line are calculated by the use of samples of a previous line with the polarity of the latter samples inverted. It is therefore possible to use the one-line delayed signal produced by the one-line delay circuit 61'. Responsive to the frame switching signal 54', the first multiplexer 66a allows passage therethrough of a signal supplied thereto during the Q frames from a third subtractor 76 and another signal delivered thereto during the P frames from an adder 77. The third subtractor 76 therefore calculates the interpolated picture elements for the Q frames. The adder 77 calculates the elements for the P frames wherein the polarity of the carrier chrominance signal is inverted. The signal produced by the third multiplexer 71 is converted by a digital-to-analog converter 79 into the reproduction of the original composite color television signal M. It will now be understood that the post-processor 22 is similar to a circuit for carrying out the sub-Nyquist decoding except for the first subtractor 33', adder 77, and first and second multiplexers 66a-66b.

Figure 9:
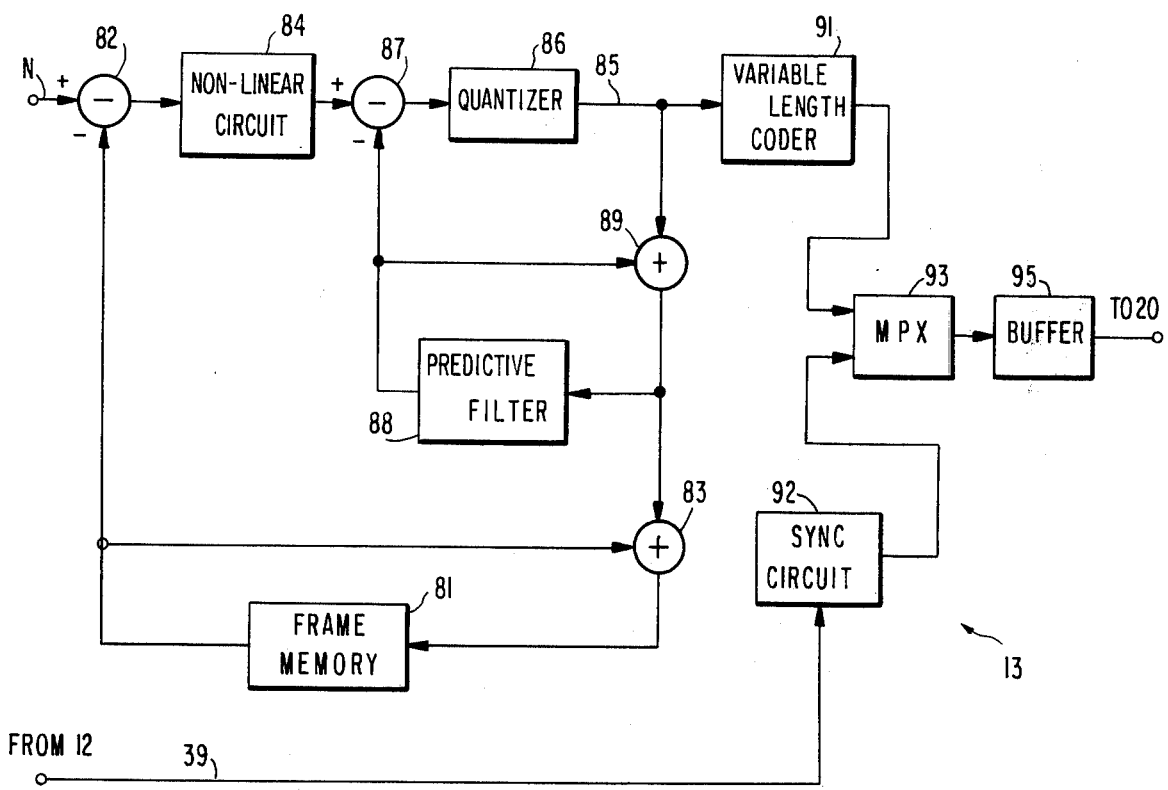
FIG. 9 is a block diagram of an interframe encoder for use in the system depicted in FIG. 1.

Finally referring to FIG. 9, an interframe encoder 13 comprises a frame memory 81 for delaying by one frame an input signal to produce a frame-delayed signal, a first subtractor 82 for subtracting the delayed signal from the converted signal N to produce an interframe difference signal, a local feedback path including a first adder 83, and a non-linear circuit 84 of a variable gain for removing noises from the difference signal to supply a noise-free signal to a known intraframe or in-frame prediction coding loop 85. The nonlinear circuit 84 is already known in the art and operates to provide a gain less than unity to an input signal of a small amplitude and another gain of about unity to an input signal of a large amplitude. Inasmuch as the amplitude of the interframe difference signal is sufficiently suppressed by the preceding pre-processor 12 when the object being televised changes very little, the nonlinear circuit 84 effectively removes small noises remaining in the interframe difference signal. The intraframe prediction coding loop 85 comprises a quantizer 86, a second subtractor 87, a predictive filter 88, and a second adder 89 connected as shown so as to remove the redundancy remaining in the interframe difference signal. The quantizer 86 quantizes an intraframe or in-frame prediction error signal derived from the interframe difference signal by the second subtractor 87 to deliver the quantized signal to a variable length code converter 91 for removing the redundancy of the quantized codes. A synchronizing code producing circuit 92 encodes the frame or line switching signal 39 together with synchronizing codes, encoding mode control codes, and other codes to supply the codes to a multiplexer 93, to which the variable length codes are supplied from the code converter 91. The multiplexed signal is supplied to a buffer memory 95 for averaging with respect to time the information produced by the intraframe prediction coding loop 85 and producing the above-mentioned interframe encoded signal at a constant bit rate. Further details of the interframe encoder 13 will not be described because it has no direct connection with the gist of this invention. If desired, reference is requested to an article contributed by Barry G. Haskell et al to Proceedings of the IEEE, Vol. 60, No. 7 (July 1972), pp. 792–799, and entitled "Interframe Coding of Videotelephone Pictures."

The interframe decoder 21 reversedly carries out the operation of the interframe encoder 13 and comprises similar parts. Description of the details is therefore believed to be unnecessary. It is, however, to be pointed out for the interpretation of the following claims that the interframe decoder 21 comprises a synchronizing code reproducing circuit responsive to the interframe encoded signal carrying the switching signal for producing a reproduction of the switching signal and that the reproducing circuit is depicted in the drawing by the synchronizing code producing circuit 92.

What is claimed is:

1. In a system for carrying out conversion between a composite color television signal and an interframe encoded signal, said television signal comprising a luminance signal and a carrier chrominance signal, said carrier chrominance signal being a subcarrier modulated by baseband chrominance signals, an encoder comprising:

converted signal producing means responsive to said television signal for producing a converted signal in which the polarity of said carrier chrominance signal is inverted in every other frame period of said television signal; and interframe encoding means for interframe encoding said converted signal into said interframe encoded signal.

2. In a system as claimed in claim 1, a decoder comprising:

interframe decoding means for decoding said interframe encoded signal into a reproduction of said converted signal; and recovering means responsive to said reproduction of the converted signal for inverting the polarity of said carrier chrominance signal in every other frame period of said television signal to produce a reproduction of said television signal.

3. A system as claimed in claim 1, wherein said converted signal producing means comprises:

separating means for separating said carrier chrominance signal from said television signal;

inverting means coupled to said separating means for inverting the polarity of said carrier chrominance signal to produce an inverted signal;

control means responsive to said television signal for producing a switching signal that varies in synchronism with the frame periods of said television signal; and switching means for switching the television signal and the inverted signal in response to said switching signal to produce said converted signal;

and wherein said interframe encoding means comprising means for encoding said switching signal to make said interframe encoded signal include said switching signal.

4. In a system as claimed in claim 3, a decoder comprising:
   interframe decoding means for decoding said interframe encoded signal into a reproduction of said converted signal; and
   recovering means responsive to said reproduction of the converted signal for inverting the polarity of said carrier chrominance signal in every other frame period of said television signal to produce a reproduction of said television signal.

5. A system as claimed in claim 4, wherein said interframe decoding means comprises means responsive to said interframe encoded signal for producing a reproduction of said switching signal; and wherein
   said recovering means comprises:
      means for separating said carrier chrominance signal from said reproduction of the converted signal;
      means for inverting the polarity of the carrier chrominance signal separated from said reproduction of the converted signal to produce a reproduction of said inverted signal; and
      means for alternatingly producing the reproduction of the converted signal and the reproduction of the inverted signal in response to said reproduction of the switching signal to produce said reproduction of the television signal.

6. A system as claimed in claim 1 wherein said converted signal producing means comprises:
   separating means for separating high frequency signals including said carrier chrominance signal from said television signal;
   first subtracting means for subtracting said separated high frequency signals from said television signal to form a first modified television signal having the high frequency signals removed therefrom,
   second subtracting means for subtracting from each line of said separated high frequency signals the adjacent preceding line of said separated high frequency signals to produce a subtraction signal, said subtraction signal having an effectively doubled chrominance component due to the 180° relation of chrominance signals in adjacent lines and a substantially reduced non-chrominance high frequency signal,
   averaging means responsive to said subtraction signal for averaging the effectively doubled chrominance component to produce an averaged chrominance component signal,
   control means responsive to said television signal for producing a switching signal that varies in synchronism with the frame periods of said television signal,
   inverter switching means responsive to said switching signal to pass said averaged chrominance component signal to an output thereof with every other frame being inverted, and
   adder means for adding the output from said inverter switching means to said first modified television signal to form said converted signal,
   and wherein said interframe encoding means comprising means for encoding said switching signal to make said interframe encoded signal include said switching signal.

7. In a system as claimed in claim 6, a decoder comprising:
   interframe decoding means for decoding said interframe encoded signal into a reproduction of said converted signal; and
   recovering means responsive to said reproduction of the converted signal for inverting the polarity of said carrier chrominance signal in every other frame period of said television signal to produce a reproduction of said television signal.

8. A system as claimed in claim 7, wherein said interframe decoding means comprises means responsive to said interframe encoded signal for producing a reproduction of said switching signal; and wherein
   said recovering means comprises:
      means for separating said carrier chrominance signal from said reproduction of the converted signal;
      means for inverting the polarity of the carrier chrominance signal separated from said reproduction of the converted signal to produce a reproduction of said inverted signal; and
      means for alternatingly producing the reproduction of the converted signal and the reproduction of the inverted signal in response to said reproduction of the switching signal to produce said reproduction of the television signal.

9. In a system as claimed in claim 6, a decoder comprising:
   interframe decoding means for decoding said interframe encoded signal into a reproduction of said converted signal; and
   recovering means responsive to said reproduction of the converted signal for inverting the polarity of said carrier chrominance signal in every other line period of said television signal to produce a reproduction of said television signal.

10. A system as claimed in claim 9, wherein said interframe decoding means comprises means responsive to said interframe encoded signal for producing a reproduction of said switching signal; and
   said recovering means comprises:
      means for separating said carrier chrominance signal from said reproduction of the converted signal;
      means for inverting the polarity of the carrier chrominance signal separated from said reproduction of the converted signal to produce a reproduction of said inverted signal; and
      means for alternatingly producing the reproduction of the converted signal and the reproduction of the inverted signal in response to said reproduction of the switching signal to produce said reproduction of the television signal.

11. In a system for carrying out conversion between a composite color television signal and an interframe encoded signal, said television signal comprising a luminance signal and a carrier chrominance signal, said carrier chrominance signal being a subcarrier modulated by baseband chrominance signals, an encoder comprising:
   converted signal producing means responsive to said television signal for producing a converted signal in which the polarity of said carrier chrominance signal is inverted in every other line period of said television signal; and
   interframe encoding means for interframe encoding said converted signal into said interframe encoded signal.

12. In a system as claimed in claim 11 a decoder comprising:

interframe decoding means for decoding said interframe encoded signal into a reproduction of said converted signal; and recovering means responsive to said reproduction of the converted signal for inverting the polarity of said carrier chrominance signal in every other line period of said television signal to produce a reproduction of said television signal.

13. A system as claimed in claim 11, wherein said converted signal producing means comprises:

separating means for separating said carrier chrominance signal from said television signal;

inverting means coupled to said separating means for inverting the polarity of said carrier chrominance signal to produce an inverted signal;

control means responsive to said television signal for producing a switching signal that varies in synchronism with the line period of said television signal; and switching means for switching the television signal and the inverted signal in response to said switching signal to produce said converted signal;

said and wherein interframe encoding means comprising means for encoding said switching signal to make said interframe encoded signal carry said switching signal.

14. In a system as claimed in claim 13, a decoder comprising:

interframe decoding means for decoding said interframe encoded signal into a reproduction of said converted signal; and recovering means responsive to said reproduction of the converted signal for inverting the polarity of said carrier chrominance signal in every other line period of said television signal to produce a reproduction of said television signal.

15. A system as claimed in claim 14, wherein said interframe decoding means comprises means responsive to said interframe encoded signal for producing a reproduction of said switching signal; and said recovering means comprises:

means for separating said carrier chrominance signal from said reproduction of the converted signal;

means for inverting the polarity of the carrier chrominance signal separated from said reproduction of the converted signal to produce a reproduction of said inverted signal; and means for alternatingly producing the reproduction of the converted signal and the reproduction of the inverted signal in response to said reproduction of the switching signal to produce said reproduction of the television signal.

16. A system as claimed in claim 11 wherein said converted signal producing means comprises:

separating means for separating high frequency signals including said carrier chrominance signal from said television signal;

first subtracting means for subtracting said separated high frequency signals from said television signal to form a first modified television signal having the high frequency signals removed therefrom, second subtracting for subtracting from each line of said separated high frequency signals the adjacent preceding line of said separated high frequency signals to produce a subtracting signal, said subtraction signal having an effectively doubled chrominance component due to the 180° relation of chrominance signals in adjacent lines and a substantially reduced non-chrominance high frequency signal, averaging means responsive to said subtraction signal for averaging the effectively doubled chrominance component to produce an averaged chrominance component signal, control means responsive to said television signal for producing a switching signal that varies in synchronism with the horizontal line periods of said television signal, inverter switching means responsive to said switching signal to pass said averaged chrominance component signal to an output thereof with every other line being inverted, and adder means for adding the output from said inverter switching means to said first modified television signal to form said converted signal, and wherein said interframe encoding means comprising means for encoding said switching signal to make said interframe encoded signal include said switching signal.

17. In a system for carrying out conversion between an analog composite television signal and a digital interframe encoded signal, said television signal comprising a luminance signal and a carrier chrominance signal, said carrier chrominance signal being a subcarrier modulated by baseband chrominance signals, an encoder comprising:

first means responsive to said composite television signal for producing a first digital television signal by sampling said composite television signal with a Nyquist sampling frequency $f_p$ set at about four times the subcarrier frequency;

second means responsive to the first digital television signal for producing a second digital television signal in which the subcarrier phase of a sub-sampled signal derived by sub-sampling, said first digital television signal with a sub-Nyquist sampling frequency $f_p/2$ differs by 90° with respect to adjacent lines;

third means responsive to the second digital television signal for producing a third digital television signal in which the polarity of said carrier chrominance signal is inverted in every other frame or in every other line; and interframe encoding means for interframe encoding said third digital television signal into said interframe encoded signal.

18. In a system as claimed in claim 17, a decoder comprising:

interframe decoding means for decoding said interframe encoded signal into a fourth digital television signal;

means responsive to said fourth digital television signal for producing a fifth digital television signal in which the polarity of said carrier chrominance signal included in the fourth digital television signal is inverted in every other frame or in every other line;

means responsive to said fifth digital television signal for producing a sixth digital television signal in which samples of said fifth digital television signal and interpolation samples derived from the interpolation operation using adjacent samples of the fifth digital television signal are multiplexed; and means responsive to the sixth digital television signal for producing said analog composite television signal.

* * * * *

UNITED STATES PATENT AND TRADEMARK OFFICE
CERTIFICATE OF CORRECTION

PATENT NO. : 4,142,205
DATED : February 27, 1979
INVENTOR(S) : Kazumoto IINUMA

It is certified that error appears in the above-identified patent and that said Letters Patent are hereby corrected as shown below:

IN THE SPECIFICATION:

Column 2, line 12 - after "encoded signals" insert -- , --

Column 4, line 13 - after "during" insert -- a -- line 51 - delete "(t - $T_F$)," insert -- Y(t - $T_F$), -- line 55 - delete " $\div$ " insert -- $\doteq$ -- line 63 - delete " $\div$ " insert -- $\doteq$ --

Column 5, line 8 - delete " $\div$ " insert -- $\doteq$ -- line 44 - delete " $\div$ " insert -- $\doteq$ -- line 48 - delete " $\div$ " insert -- $\doteq$ --

Column 6, line 27 - delete " $\div$ " insert -- $\doteq$ -- line 33 - delete "ti"

UNITED STATES PATENT AND TRADEMARK OFFICE
CERTIFICATE OF CORRECTION

PATENT NO. : 4,142,205
DATED : February 27, 1979
INVENTOR(S) : Kazumoto IINUMA

It is certified that error appears in the above-identified patent and that said Letters Patent are hereby corrected as shown below:

IN THE SPECIFICATION:

Column 6, line 67 - delete "the present joint applicants and assign-"

line 68 - delete "ors" insert -- and assigned --

Column 8, line 43 - delete "$(1-z^{-2})$" insert -- $(1 + z^{-2})$ --

IN THE CLAIMS:

Column 12, line 67 - after "claim 11" insert -- , --

Column 13, line 23 - before "and" delete "said"

line 23 - after "wherein" insert -- said -- line 62 - after "second subtracting" insert -- means --

Column 14, line 37 - after "signal" insert -- is --

Signed and Sealed this

Twenty-sixth Day of June 1979

[SEAL]

Attest:

RUTH C. MASON
*Attesting Officer*

DONALD W. BANNER
*Commissioner of Patents and Trademarks*